(12) United States Patent
Kim et al.

(10) Patent No.: US 9,377,370 B2
(45) Date of Patent: Jun. 28, 2016

(54) HEAT FLUX GAUGE WITH MICRO-SCALE TEMPERATURE SENSORS

(75) Inventors: Yong Weon Kim, San Diego, CA (US); Leonel Ochoa Arellano, Poway, CA (US)

(73) Assignee: Solar Turbines Incorporated, San Diego, CA (US)

( * ) Notice: Subject to any disclaimer, the term of this patent is extended or adjusted under 35 U.S.C. 154(b) by 804 days.

(21) Appl. No.: 13/409,014

(22) Filed: Feb. 29, 2012

(65) Prior Publication Data

US 2013/0223473 A1 Aug. 29, 2013

(51) Int. Cl.
*G01K 17/00* (2006.01)
*G01K 3/04* (2006.01)
*G01K 11/06* (2006.01)

(52) U.S. Cl.
CPC ........ *G01K 17/00* (2013.01); *G01K 3/04* (2013.01); *G01K 11/06* (2013.01)

(58) Field of Classification Search
CPC ... G01M 15/14; G06F 2217/80; G01K 17/20; G01K 17/00; G01K 1/14; G01K 1/024; G01K 2205/00; G01K 7/028; G01K 13/00; G01K 13/10; G01N 25/18; G01N 29/2475; G01N 2001/2285; G01N 25/488; G01N 27/18; G01N 29/2481; F01D 21/003; F01D 17/02; F01D 17/085; F05D 2260/80
USPC .......... 73/75, 77; 374/12, 13, 29, 43–57, 100, 374/101, 117, 137, 148, 153, 163, 166, 179, 374/180, 185, 187, 188, 204, 208, E17.001, 374/E7.004, E7.005, E7.006, E1.018, 374/E1.019, E7.011, E7.013
See application file for complete search history.

(56) References Cited

U.S. PATENT DOCUMENTS

| | | | |
|---|---|---|---|
| 4,092,862 A * | 6/1978 | Taylor | 374/137 |
| 4,916,715 A | 4/1990 | Adiutori | |
| 5,048,973 A | 9/1991 | Liebert et al. | |
| 6,838,157 B2 * | 1/2005 | Subramanian | 428/173 |
| 8,004,423 B2 * | 8/2011 | Mitchell et al. | 340/870.17 |
| 8,006,544 B2 | 8/2011 | Holmes et al. | |
| 2012/0128468 A1 * | 5/2012 | Schleif et al. | 415/118 |
| 2014/0003460 A1 * | 1/2014 | Keyser et al. | 374/31 |

OTHER PUBLICATIONS

Sauereisen specification sheet—thermal potting cement No. 11, Jun. 2003.*
Viacheslav G. Kuryachiy: "University of South Florida Irradiated single crystal 3C-SiC as a maximum temperature sensor Scholar Commons Citation", Jan. 1, 2008, http://scholarcommons.usf.edu/cgi/viewcontent.cgi?article=1350&context=etd , p. 13, paragraph 2.4—p. 16.

(Continued)

*Primary Examiner* — Daniel S Larkin
*Assistant Examiner* — Jamar Ray
(74) *Attorney, Agent, or Firm* — Finnegan, Henderson, Farabow, Garrett & Dunner, LLP (57) ABSTRACT

An apparatus for measuring temperature parameters of a structure is provided. The apparatus comprises: a carrier including at least one receiving portion; and a plurality of temperature sensors disposed within the at least one receiving portion and secured to the receiving portion via a bonding medium, the sensors being distributed along at least one direction of the carrier and configured to measure and record temperature information through microstructural changes corresponding to temperatures experienced by the respective sensors.

15 Claims, 11 Drawing Sheets

(56) References Cited

OTHER PUBLICATIONS

Alex A. Volinsky et al: "Irradiated Single Crystals for High Temperature Measurements in Space Applications", MRS Online Proceedings Library, Jan. 1, 2004, Http://journals.cambridge.org/abstractsS194642740079744 , whole document.

G. Lozino-Lozinsky et al: "Lessons learned from the BOR flight campaign" Proceedings of the 3rd European Symposium on Aerothermodynamics for Space Vehicles, 1998, ESTEC, Noodwijk, The Netherlands, Dec. 1, 1998, pp. 675-683. Http://articles.adsabs.hardvard.edu/cgi-bin/nph-iarticle_query?1999ESAP.426.675L&defaultpring-YES&page_ind=0&filetype=.pdf.

* cited by examiner

HEAT FLUX GAUGE WITH MICRO-SCALE TEMPERATURE SENSORS

TECHNICAL FIELD

The present disclosure relates generally to a heat flux gauge using micro-scale temperature sensors.

BACKGROUND

Measuring heat transfer parameters in high pressure and high temperature environments is a difficult task. One such environment is in a gas turbine engine where heat flux through various engine components, such as turbine blades and combustor liner walls, is an important parameter for engine control, design, and maintenance. Heat transfer parameters may be obtained based on temperature data collected at different portions of a component. Reliable and accurate temperature measurements are desirable in such applications.

U.S. Pat. No. 8,006,544 to Holmes describes an apparatus for testing failure of a material used in a jet engine. The apparatus uses one or more miniature jet engine components made from a material used in a full-size jet engine. Because components of a miniature jet engine attain similar temperatures and exhausts to those exhibited by a full-size jet engine, the miniature jet engine components provide an effective test vehicle for testing of components and particular materials used to manufacture such components for a jet engine. The stress fields experienced by a component of a miniature jet engine are geometrically similar in both gradient and magnitude to those found in full-size engines, even though the volumes of material involved in the test components are far smaller.

SUMMARY

According one embodiment, an apparatus for measuring temperature parameters of a structure is provided. The apparatus comprises: a carrier including at least one receiving portion; and a plurality of temperature sensors disposed within the at least one receiving portion and secured to the receiving portion via a bonding medium, the sensors being distributed along at least one direction of the carrier and configured to measure and record temperature information through microstructural changes corresponding to temperatures experienced by the respective sensors.

According to another embodiment, a system for measuring heat flux through a supporting structure of a gas turbine engine is provided. The system comprises: a cavity formed on a surface of the supporting structure of the gas turbine engine; and a temperature gauge disposed within the cavity. The temperature gauge comprises: a carrier including at least one receiving portion; and a plurality of sensors disposed within the at least one receiving portion and secured to the receiving portion via a bonding medium, the sensors being distributed along at least one direction and configured to measure and record temperature information through microstructural changes corresponding to temperatures experienced by the respective sensors.

According to still another embodiment, a method for measuring temperature parameters of a structure is provided. The method comprises: disposing a heat flux gauge in a cavity of the structure, the heat flux gauge including a plurality of temperature sensors disposed in a carrier; operating a device to create a temperature gradient in the structure; detecting temperature information through microstructural changes corresponding to temperatures experienced by the respective sensors; and determining a measurement of heat transfer across at least a portion of the structure based on the received signals.

DETAILED DESCRIPTION

Figure 1A:
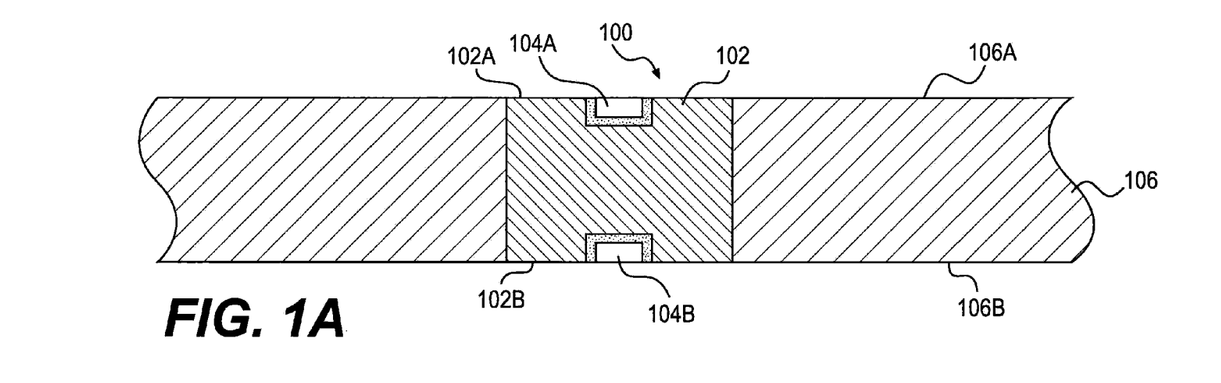
FIG. 1A is a cross-sectional illustration of an exemplary disclosed heat flux gauge disposed in a supporting structure.

FIG. 1A illustrates an exemplary heat flux gauge 100 for measuring heat transfer parameters of a supporting structure 106. Heat flux gauge 100 includes, among other components, a carrier 102 and a plurality of sensors 104A and 104B. Carrier 102 holds sensors 104A and 104B and is disposed within a cavity, such as a hole or bore, of supporting structure 106. Carrier 102 may be secured within the hole by an interference fit or via a bonding material suitable for high temperature and high pressure applications. Carrier 102 may be formed by one or more of a variety of materials including ceramic, Inconel, Hastelloy, or other nickel based alloys that possess mechanical and thermal properties capable of withstanding a high temperature environment.

Figure 1B:
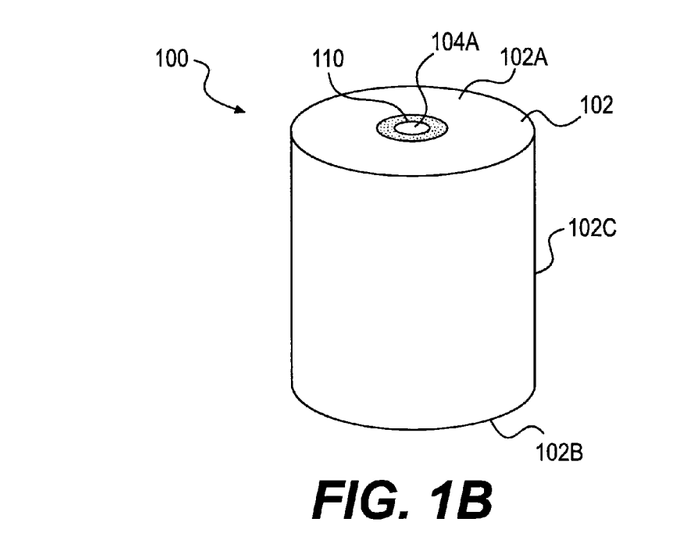
FIG. 1B is a perspective view of the exemplary disclosed heat flux gauge shown in FIG. 1A.

Carrier 102 may take various shapes, such as cylinder, cube, cone, etc. FIG. 1B shows heat flux gauge 100 having a cylindrical carrier 102. Specifically, carrier 102 has a first end face 102A, a second end face 102B, and a cylindrical side wall 102C. Carrier 102 may have dimensions suitable for installation on a wide range of mechanical components, such as turbine blades and turbine combustor walls of a gas turbine engine or pistons of a gas or diesel engine. Specifically, the axial length of side wall 102C may be substantially equal to a thickness of supporting structure 106. As a result, when fully disposed within supporting structure 106, first end face 102A of carrier 102 is substantially flush with a first surface 106A of supporting structure 106, and second end face 102B of carrier 102 is substantially flush with a second surface 106B of supporting structure 106. The radial dimension of cylindrical carrier 102 may be kept to a minimum to reduce a footprint of heat flux gauge 100 so that the presence of heat flux gauge 100 does not substantially affect the strength and operation of supporting structure 106. In one embodiment, the radial dimension of cylindrical carrier 102 is 6 mm or less. Alternatively, it may be made greater or smaller as deemed necessary.

Figure 1C:
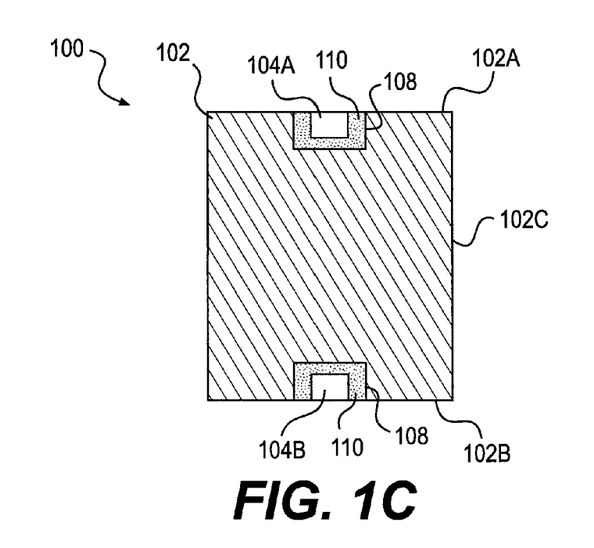
FIG. 1C is a cross-sectional illustration of the exemplary disclosed heat flux gauge shown in FIG. 1B.

As further shown in the cross-sectional view of FIG. 1C, first end face 102A and second end face 102B of carrier 102 each have a receiving portion or a cavity 108 disposed thereupon. Cavity 108 may take the form of a hole, a bore, an alcove, a recess, or a hollow made on first end face 102A and second end face 102B. The size of each cavity 108 is sufficient to accommodate sensor 104A or 104B. As a result, when disposed within cavity 108, sensors 104A and 104B are flush with first end face 102A and second end face 102B.

As further shown in FIG. 1C, sensors 104A and 104B are secured within corresponding cavities 108 by a bonding material 110 filled within cavities 108. Bonding material 110 may include an adhesive with high thermo conductivity and suitable for high temperature and high pressure applications. In addition, bonding material 110 may be water soluble so that it can be removed by applying a water-based solvent. In one embodiment, bonding material 110 may be a commercially available adhesive having the above-described properties, such as THERMAL POTTING CEMENT NO. 11 or ELECTRICAL CEMENT NO. DW-30 provided by Sauereisen, Inc.

Sensors 104A and 104B may be made into various shapes, such as a cylinder, cube, sphere, etc., and have dimensions at the micrometer scale. In one embodiment, sensors 104A and 104B each have a spherical shape with a diameter of substantially 10 μm. In another embodiment, sensor 104A and 104B each have a cubical shape with a size of substantially 10 μm×10 μm×10 μm. In still another embodiment, sensors 104A and 104B are shaped into rectangular prisms with a size of substantially 200 μm×200 μm×380 μm. Other shapes and dimensions for sensors 104A and 104B will be appreciated by one skilled in the art.

Sensors 104A and 104B are suitable for measuring temperatures in a wide temperature range and in high temperature and high pressure environments, such as the conditions experienced within a gas turbine engine during operation. For example, sensors 104A and 104B may be configured to measure temperatures between 150° C. and 1450° C.

Sensors 104A and 104B may record and provide temperature information through microstructural changes without the need for wires. Specifically, sensors 104A and 104B may emit electromagnetic radiation as a function of the temperature surrounding the sensors. For example, sensor 104A and 104B may be made of a crystal, such as the silicon carbide or the Izmeritel Maximalnoi Temperaturi Kristalicheskii (IMTK) crystal. The material of the sensor may produce microstructural changes, such as deformations of crystal grids or molecular positions, according to the temperature surrounding the sensors. Due to the microstructural changes, sensors 104A and 104B may emit electromagnetic radiation or reflect an incoming laser signal indicative of the temperature sensed by sensors 104A and 104B. In a further embodiment, sensors 104A and 104B may retain the microstructural changes and hence the information of the temperature. As a result, the temperatures sensed by sensors 104A and 104B may be read by wirelessly detecting the radiation from the sensor or the microstructural changes of the sensor after the heat flux gauge is removed from the supporting structure. For example, a detector, such as an X-ray defractometry may be used to detect the microstructural changes of sensors 104A and 104B and convert the same to temperature data. Therefore, heat flux gauge 100 does not require wired connections for transmitting temperature data from sensors 104A and 104B to the external receiver and is therefore particularly suitable for high temperature and high pressure environments or mechanical systems having movable components. According to a further embodiment, the material of sensors 104A and 104B has the ability to retain the temperature information after sensors 104A and 104B are removed from carrier 102, and sensors 104A and 104B may be taken out of carrier 102 to collect the temperature information. According to a still further embodiment, sensors 104A and 104B may be made of a gypsum type of material, which provides phase changes in various temperature. For example, the sensors 104A and 104B may partially transform from solid to liquid at a particular temperature. As a result, the temperature may be determined by checking the phase of sensors 104A and 104B.

Heat flux gauge 100 may be disposed in supporting structure 106 so that sensors 104A and 104B are arranged along the direction of the heat transfer. For example, as shown in FIG. 1A, first surface 106A of supporting structure 106 may have a temperature different from that of second surface 106B. Due to the temperature difference, heat is transferred along a direction perpendicular to surfaces 106A and 106B. Accordingly, heat flux gauge 100 is oriented so that sensors 104A and 104B are arranged along the direction of the heat transfer, e.g., perpendicular to surfaces 106A and 106B. As a result, sensor 104A provides the temperature data near first surface 106A, while sensor 104B provides the temperature data near second surface 106B. The temperature data collected by sensors 104A and 104B may be used to determine a temperature gradient and heat transfer parameters along the direction perpendicular to surfaces 106A and 106B. If temperature data is desired along different directions, heat flux gauge 100 may be oriented along those directions.

Figure 2:
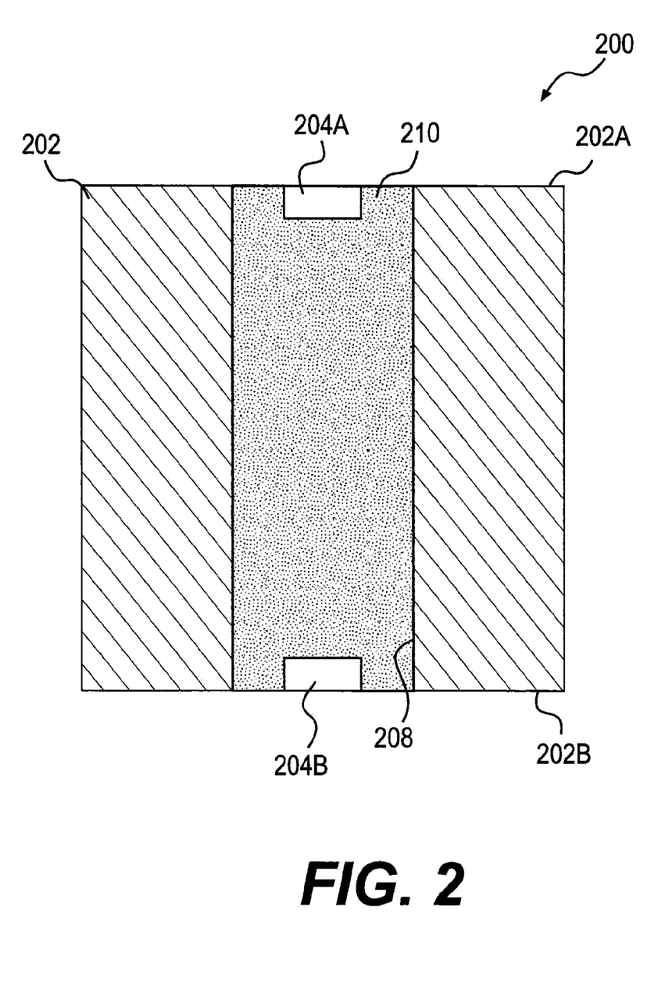
FIG. 2 is a cross-sectional illustration of another exemplary disclosed heat flux gauge.

FIG. 2 shows a cross-sectional illustration of another exemplary disclosed heat flux gauge 200. Similar to heat flux gauge 100, heat flux gauge 200 has a cylindrical carrier 202. Unlike heat flux gauge 100, however, which has a cavity in the form of a hollow or recess for accommodating sensors 104A and 104B, heat flux gauge 200 has a cavity in the form of a bore or a through hole 208 extending completely through carrier 202 in the axial direction. Bore or through hole 208 may or may not align axially with an axis of cylindrical carrier 202. In addition, a bonding material 210, such as the bonding material 110 discussed above, is filled within the through hole 208. A sensor 204A is disposed within the through hole 208 substantially flush with first end face 202A of carrier 200 and secured by bonding material 210. Similarly, a sensor 204B is disposed within the through hole 208 substantially flush with second end face 202B of carrier 202 and also secured by bonding material 210. Sensors 204A and 204B are similar to sensors 104A and 104B described above and do not extend substantially beyond first end face 202A and second end face 202B. Similar to heat flux gauge 100, heat flux gauge 200 may be installed on a supporting structure and used to measure temperature gradients and heat transfer parameters along the axial direction of carrier 202.

Figure 3A:
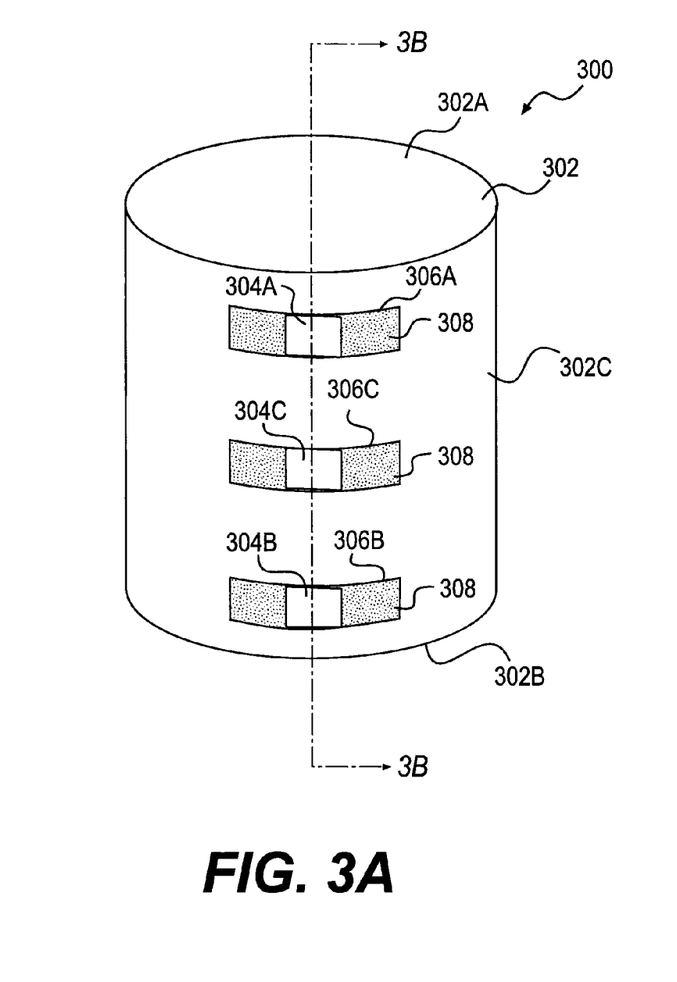
FIG. 3A is a perspective view of another exemplary disclosed heat flux gauge.
Figure 3B:
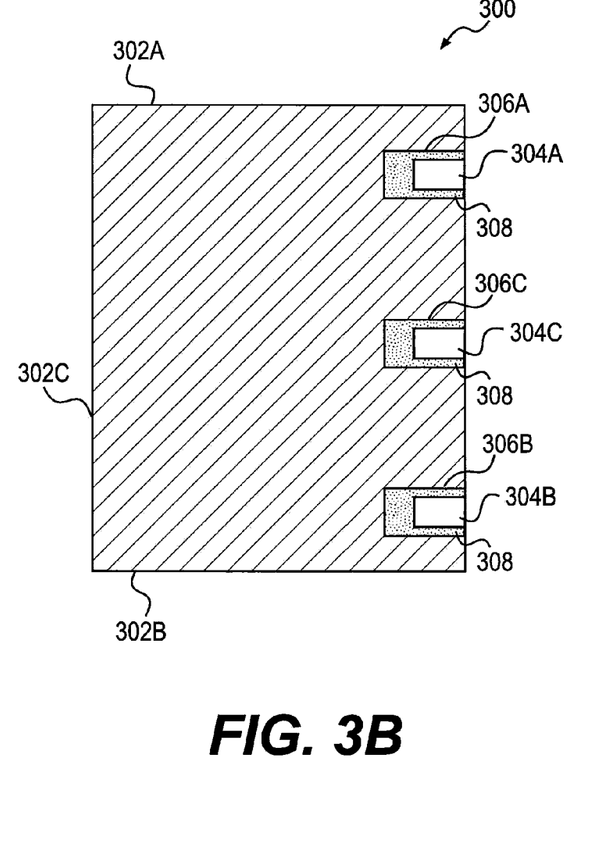
FIG. 3B is a cross-sectional illustration of the exemplary disclosed heat flux gauge shown in FIG. 3A.

FIGS. 3A and 3B shows another exemplary disclosed heat flux gauge 300, which has a cylindrical carrier 302 and a plurality of sensors 304A-C. Sensors 304A-C are similar to sensors 104A and 104B described above. The material and dimensions of carrier 302 are similar to those of carrier 102 described above.

Carrier 302 has three cavities 306A-C on cylindrical side wall 302C for accommodating sensors 304A-C. Cavities 306A-C may be holes, bores, alcoves, recesses, or hollows disposed on side wall 302C. More particularly, cavity 306A is disposed adjacent to first end face 302A of carrier 302, cavity 306B is disposed adjacent to second end face 302B of carrier 302, and cavity 306C is disposed substantially in a middle section of side wall 302C between cavities 306A and 306B. Cavities 306A-C may be aligned along the axial direction of carrier 302 as shown in FIG. 3A. Alternatively, cavities 304A-C may be located at different circumferential positions along carrier 302.

Sensors 304A-C are disposed within cavities 306A-C, respectively, and secured in place by a bonding material 308, which is the same as bonding material 110 described above. When installed, sensors 304A-C are flush with or recessed within the side wall 302C of carrier 302. As a result, sensors 304A-C do not interfere with the installation of heat flux gauge 300 on supporting structures.

Similar to heat flux gauge 100, heat flux gauge 300 may be used to measure the temperature gradient and heat transfer parameters along an axial direction of carrier 302. Because heat flux gauge 300 has a greater number of sensors than heat flux gauge 100, it can provide temperature measurements on a finer scale and, thus, allow more accurate determinations of the temperature gradient and heat transfer parameters. Furthermore, additional sensors, similar to sensors 304A-C, may be added and disposed on first end face 302A, second end face 302B, or side wall 302C to further increase temperature data points and enhance the accuracy of the measurements.

Figure 4A:
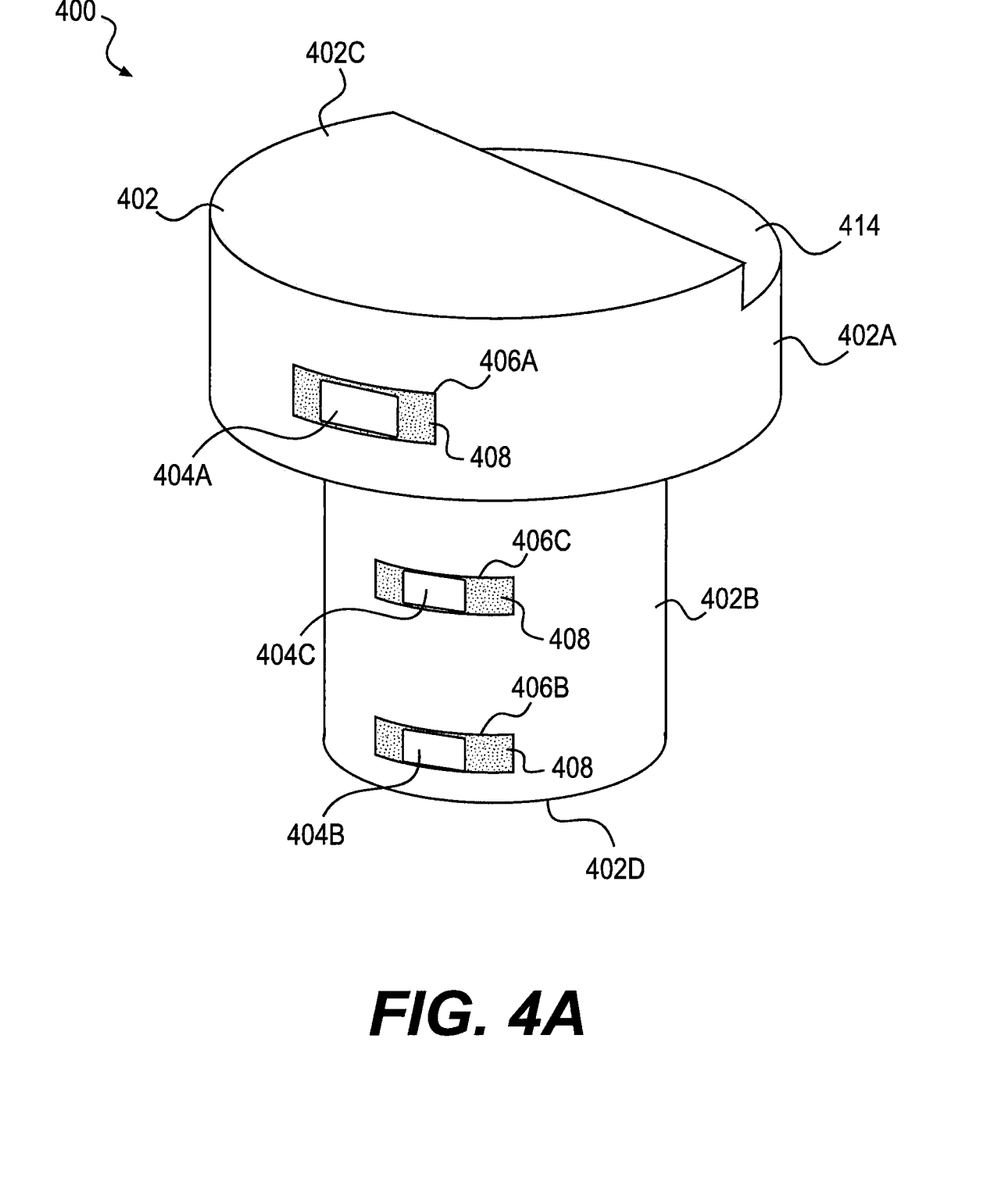
FIG. 4A is a perspective view of another exemplary disclosed heat flux gauge.
Figure 4B:
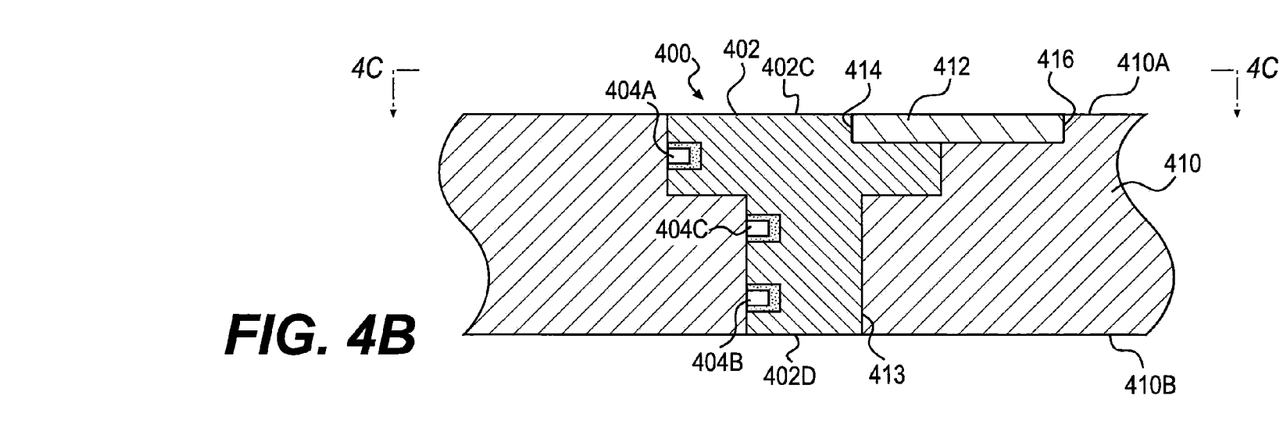
FIG. 4B is a cross-sectional illustration of the exemplary disclosed heat flux gauge shown in FIG. 4A, when it is disposed in and secured to a supporting structure.
Figure 4C:
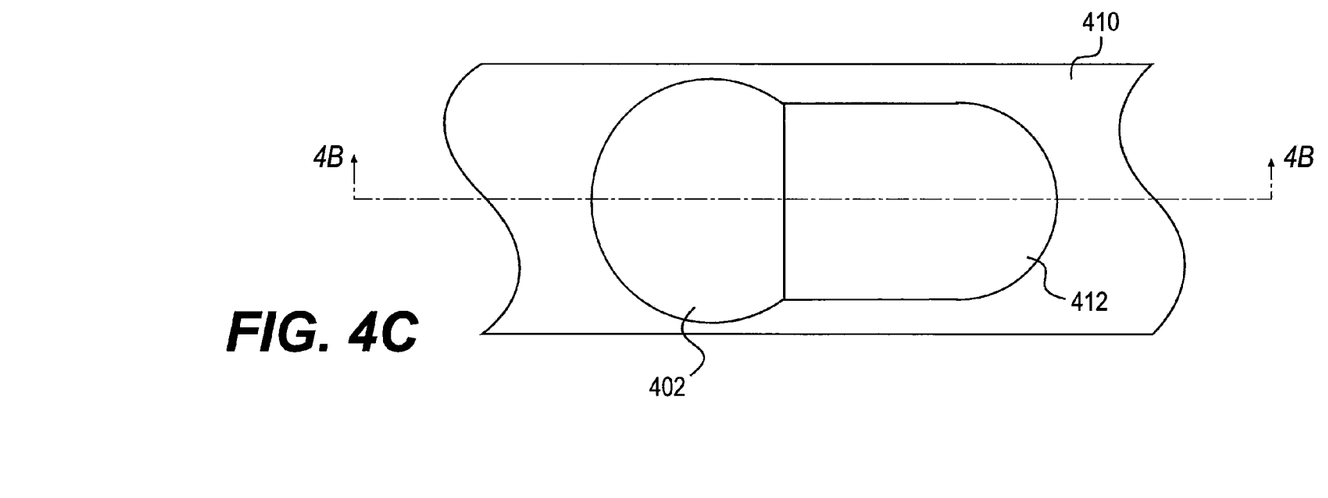
FIG. 4C is a top view of the exemplary disclosed heat flux gauge of FIGS. 4A and 4B when secured to the supporting structure.

FIGS. 4A-C illustrate another exemplary disclosed heat flux gauge 400 including a bolt-shaped or a plug-shaped carrier 402 and a plurality of sensors 404A-C. As depicted in FIG. 4A, carrier 402 of heat flux gauge 400 includes a larger shape at a first axial end, such as a first cylindrical section 402A, and a smaller shape at a second axial end, such as a second cylindrical section 402B. Sections 402A and 402B may or may not be aligned co-axially. Furthermore, the radial dimension of one section, e.g., section 402A, is greater than the radial dimension of the other section, e.g., section 402B. The axial and radial dimensions of sections 402A and 402B may be at the millimeter scale or may be adapted to the dimensions of the supporting structures. Sections 402A and 402B may be manufactured as one piece or may be manufactured separately and bonded or welded together. The materials of sections 402A and 402B may be the same as or similar to those of carrier 102 described above.

A plurality of cavities 406A-C are disposed on the side walls of sections 402A and 402B of carrier 402 for accommodating sensors 404A-C in a similar manner as described above. For example, as shown in FIG. 4A, the side wall of section 402A has one cavity 406A, and the side wall of section 402B has two cavities 406B and 406C. Cavities 406A-C are similar to cavities 306A-C depicted in FIG. 3A. Furthermore, cavity 406A is disposed adjacent end face 402C, and cavity 406C is disposed adjacent end face 402D. Cavity 406C is disposed on the side wall of section 402B between cavities 406A and 406B. If desired, additional cavities may be added and disposed on the side walls and the end faces of carrier 402.

Sensors 404A-C are the same or similar to sensors 304A-C described above in connection with FIG. 3 and are disposed within cavities 406A-C, respectively. Sensors 404A-C are secured in place by a bonding material 408 that is the same or similar to bonding material 110 described above. In addition, sensors 404A-C remain flush or recessed within the side walls of sections 402A and 402B. As a result, sensors 404A-C do not interfere with the installation of heat flux gauge 400 within supporting structures.

As illustrated in FIGS. 4B and 4C, heat flux gauge 400 may be disposed within a supporting structure 410 through a hole or bore 413 in supporting structure 410. The shape of hole 413 is complementary to that of carrier 402.

Heat flux gauge 400 may be secured within hole 413 by an interference fit between the side walls of carrier 402 and an inner wall of hole 413 in supporting structure 410. Alternatively, as shown in FIGS. 4A-C, heat flux gauge 400 may be secured within hole 413 by an insert fixture 412 pressed within supporting structure 410. Specifically, as shown in FIG. 4A, a portion of section 402A of carrier 402 includes a cut away forming a step 414 in an axial end face of carrier 402 portion. Step 414 of section 402A complements an end section of insert fixture 412. In addition, as shown in FIGS. 4B and 4C, supporting structure 410 also has a cut-away portion 416, which complements the other end section of insert fixture 412. When heat flux gauge 400 is fully inserted into the hole of supporting structure 410, the cut-away portions of section 402A and supporting structure 410 form a slot, which has a shape complementary to that of insert fixture 412. Insert fixture 412 may be disposed and secured within the slot by an interference fit between insert fixture 412 and supporting structure 410. Alternatively, insert fixture 412 may be secured in place by welding or a suitable bonding material. When fully disposed and secured within the slot, insert fixture 412 in conjunction with the different sizes of sections 402A and 402B prevents heat flux gauge 400 from rotating within hole 413 and from axial movement within hole 413.

When heat flux gauge 400 and insert fixture 412 are fully inserted and secured, end face 402C of carrier 402 and insert fixture 412 are substantially flush with surface 410A of supporting structure 410. Similarly, end face 402D of carrier 402 is substantially flush with surface 410B of supporting structure 410.

Still alternatively, heat flux gauge 400 may be secured within the hole 413 of supporting structure 410 with the assistance of a pressure difference between surfaces 410A and 410B. For example, when the pressure near surface 410A is higher than the pressure near surface 410B, heat flux gauge 400 may be arranged in supporting structure 410 such that end face 402C, which has a greater radial dimension, is oriented towards the high pressure side. On the other hand, end face 402D, which has a smaller radial dimension, is oriented towards the low pressure side. As a result, the pressure difference between surfaces 410A and 410B prevents heat flux gauge 400 from axial movement within hole 412. In this arrangement, step 414 and insert fixture may be omitted, and the heat flux gauge 400 may also be otherwise assisted in securement by an interference fit or a bonding agent.

When heat flux gauge 400 is disposed within supporting structure 410, sensors 404A-C can provide temperature data along the axial direction of carrier 402. As shown in FIG. 4B, sensor 404A provides temperature data near surface 410A of supporting structure 410, sensor 404B provides temperature data near surface 410B of supporting structure 410, and sensor 404C provides temperature data of a middle section between surfaces 410A and 410B. Accordingly, the temperature gradient and heat transfer parameters may be determined along the axial direction based on the temperature data provided by sensors 404A-C. While the cross sections of sections 402A and 402B of carrier 402 are shown in FIGS. 4A-4C as cylindrical, other shapes are possible. For example, sections 402A and/or 402B may have a square or rectangular cross section.

Figure 5:
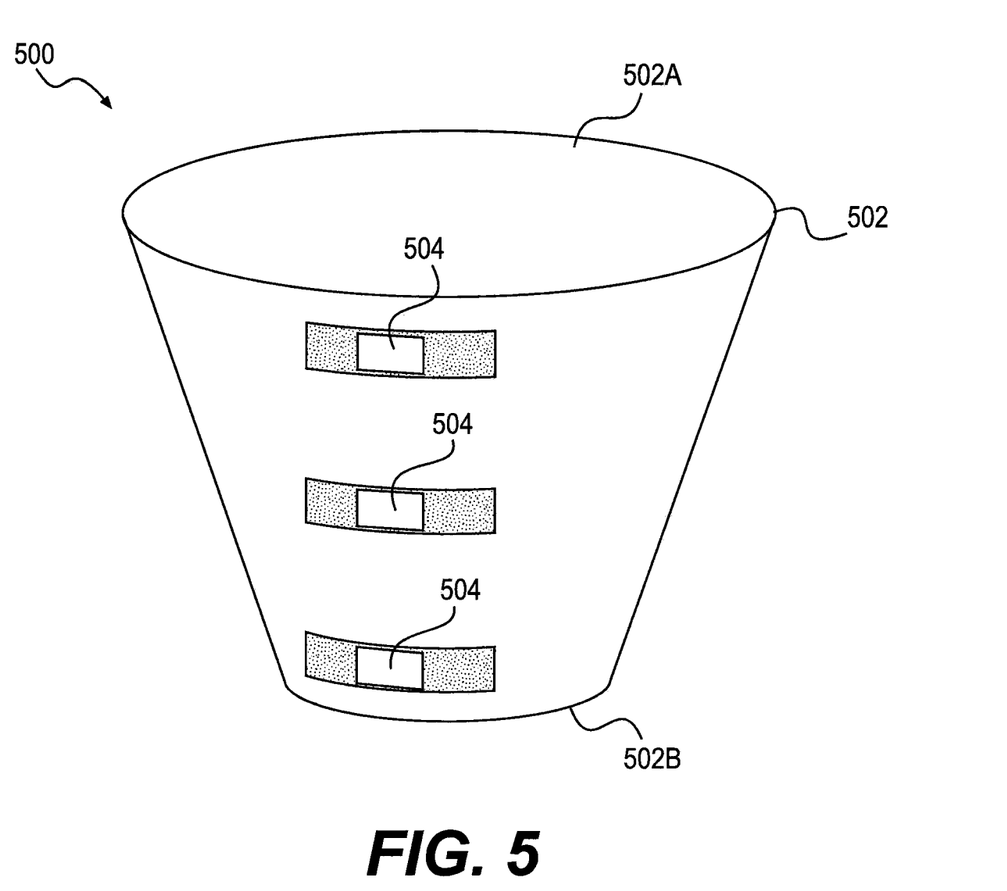
FIG. 5 is a perspective illustration of another exemplary disclosed heat flux gauge.

FIG. 5 shows a perspective illustration of another exemplary disclosed heat flux gauge 500 including a cone-shaped carrier 502 and a plurality of sensors 504. In particular, the radial dimension of a first axial end or end face 502A is greater than the radial dimension of a second axial end or end face 502B. Similar to heat flux gauge 400, when heat flux gauge 500 is disposed within a supporting structure, end face 502A may be oriented towards a high pressure side, and end face 502B may be oriented towards a low pressure side. The pressure difference between the high pressure side and the low pressure side prevents or assists in preventing heat flux gauge 500 from axial movement within the supporting structure. Other aspects of heat flux gauge 500 generally correspond to heat flux gauge 400 and will be appreciated by one skilled in the art upon studying this disclosure.

Figure 6:
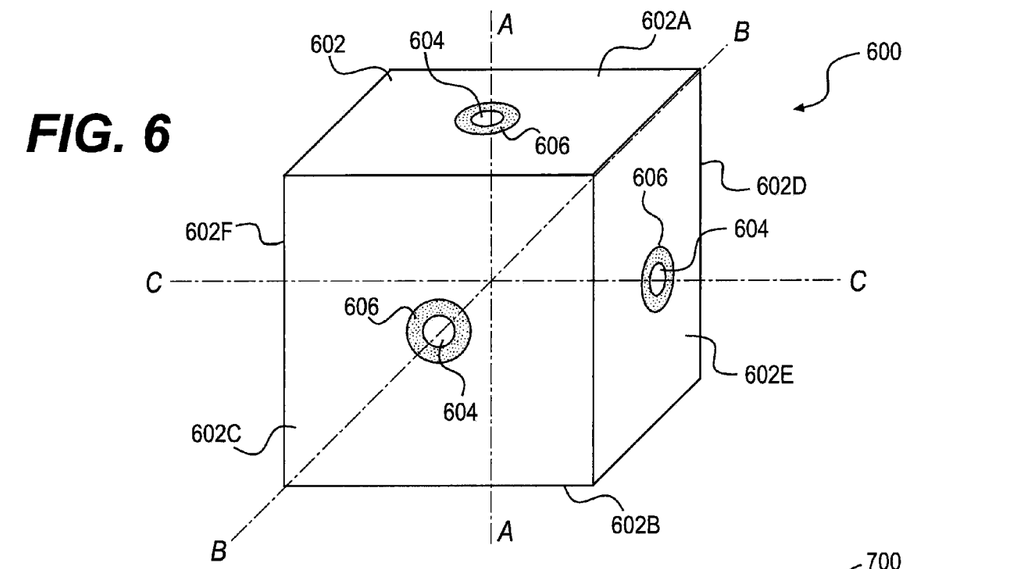
FIG. 6 is a perspective illustration of another exemplary disclosed heat flux gauge.

According to further embodiments, temperature sensors may also be arranged along a plurality of directions within a carrier so as to provide temperature data along multiple directions. For example, FIG. 6 shows a perspective illustration of an exemplary disclosed heat flux gauge 600 including a cubical carrier 602 and a plurality of sensors 604. Each face of cubical carrier 602 has a cavity disposed at substantially a center of each face. Sensors 604 are disposed within corresponding cavities and secured by a bonding material 606 the same as or similar to bonding material 110 described above.

Because of the multi-directional distribution of sensors 604 within carrier 602, when disposed within a supporting structure, heat flux gauge 600 may provide temperature data along a plurality of directions, e.g., the A-A, B-B, and C-C directions. Along each direction, heat flux gauge 600 may provide at least three temperature data points. For example, in the A-A direction, sensor 604 on face 602A provides a temperature near face 602A, sensor 604 on face 602B provides a temperature near face 602B, and at least one of sensors 604 disposed on the other four faces provide temperatures of a middle section between face 602A and 602B. Accordingly, the temperature gradient and heat transfer parameters in the A-A direction may be determined based on these temperature data. Similarly, temperature data and heat transfer parameters may be measured along other directions. Other aspects of heat flux gauge 600 are the same or similar to those of heat flux gauges 100-500 and will be appreciated by one skilled in the art upon studying this disclosure.

Figure 7:
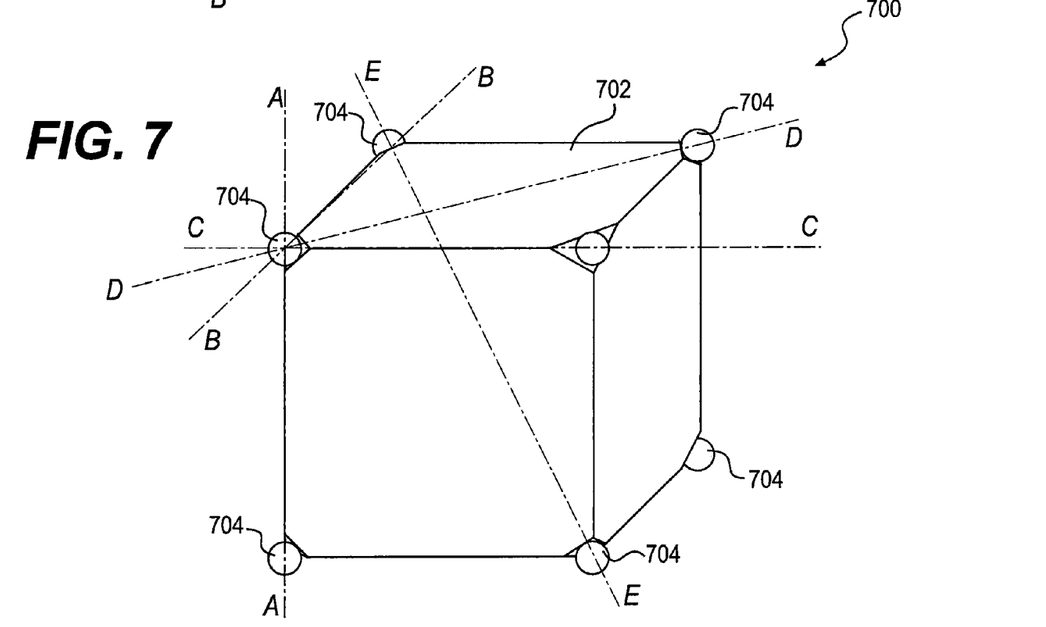
FIG. 7 is a perspective illustration of another exemplary disclosed heat flux gauge.

FIG. 7 depicts a perspective illustration of another exemplary disclosed heat flux gauge 700 including a cubical carrier 702 and a plurality of sensors 704 disposed at substantially respective corners (i.e., vertices) of carrier 702. Specifically, a tip of each corner of carrier 702 is cut away to provide a mounting area for securing a corresponding sensor 704. Similar to heat flux gauge 600, heat flux gauge 700 can provide temperature data along a plurality of directions. For example, heat flux gauge 700 may be used to measure temperate gradients along the edges of cubical carrier 702, e.g., the A-A, B-B, and C-C directions. In addition, heat flux gauge 700 can also measure temperate data along the opposite corners on each face of carrier 702, e.g., the D-D direction, or along the opposite corners on different faces of carrier 702, e.g., the E-E direction. Other aspects of heat flux gauge 700 are the same or similar to those of heat flux gauges 100-600 and will be appreciated by one skilled in the art upon reading the disclosure.

Figure 8A:
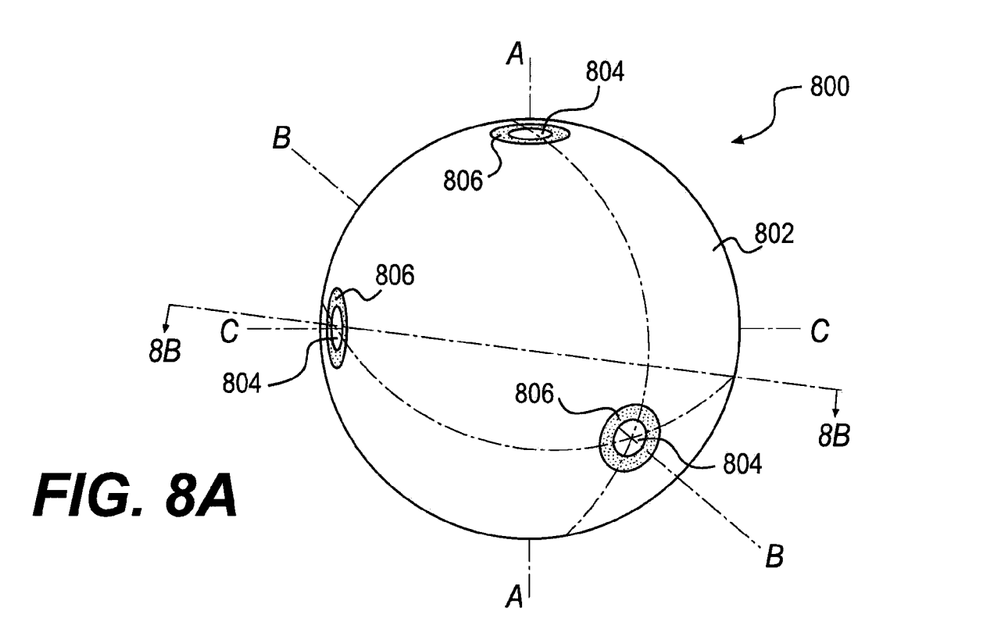
FIG. 8A is a perspective illustration of another exemplary disclosed heat flux gauge.
Figure 8B:
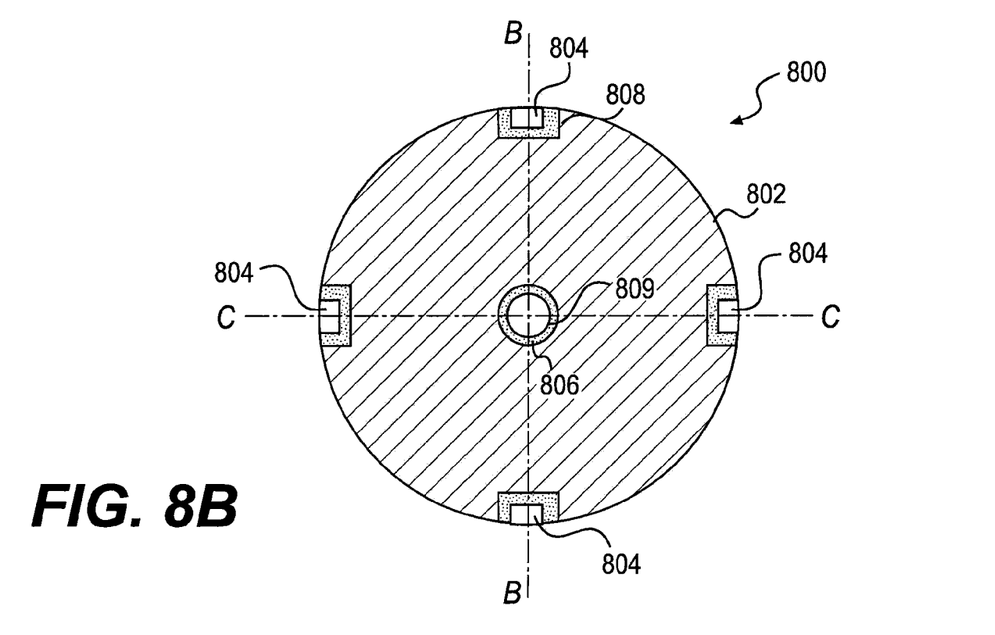
FIG. 8B is a cross-sectional illustration of the heat flux gauge of FIG. 8A.

FIGS. 8A and 8B illustrate another exemplary disclosed heat flux gauge 800 including a spherical carrier 802 and a plurality of sensors 804. Carrier 802, which has a spherical shape, includes a plurality of cavities 808 made thereupon in three perpendicular directions, i.e., the A-A, B-B, and C-C directions. In addition, cavities 808 are disposed substantially on the great circles of carrier 802 in those three directions and are arranged in opposite poles. As a result, each pair of cavities 808 are disposed substantially close to a pair of antipodal points of spherical carrier 802. Sensors 804 are disposed within cavities 808 and secured by a bonding material the same as or similar to cavities 108 and bonding material 110 described above.

According to a further embodiment, as depicted in FIG. 8B, an additional sensor 809 may be embedded and secured substantially at a center of carrier 802. For example, carrier 802 may be manufactured as two separate semi spheres. A cavity 808 may be made at the center of each semi sphere for accommodating sensor 809. Sensor 809 is disposed in one of the cavities before the semi spheres are combined to form carrier 802.

When disposed in a supporting structure, heat flux gauge 800 can provide temperature data along at least three directions, i.e., the A-A, B-B, and C-C directions. In each direction, heat flux gauge 800 can provide at least three temperature data points. For example, in the A-A direction, temperature data may be collected by sensors 804 disposed along the A-A direction on the surface of carrier 802 and by sensor 809 disposed at the center of carrier 802. Other aspects of heat flux gauge 800 are the same as or similar to those of heat flux gauges 100-700 described above and will be appreciated by one skilled in the art upon studying this disclosure.

INDUSTRIAL APPLICABILITY

Figure 9A:
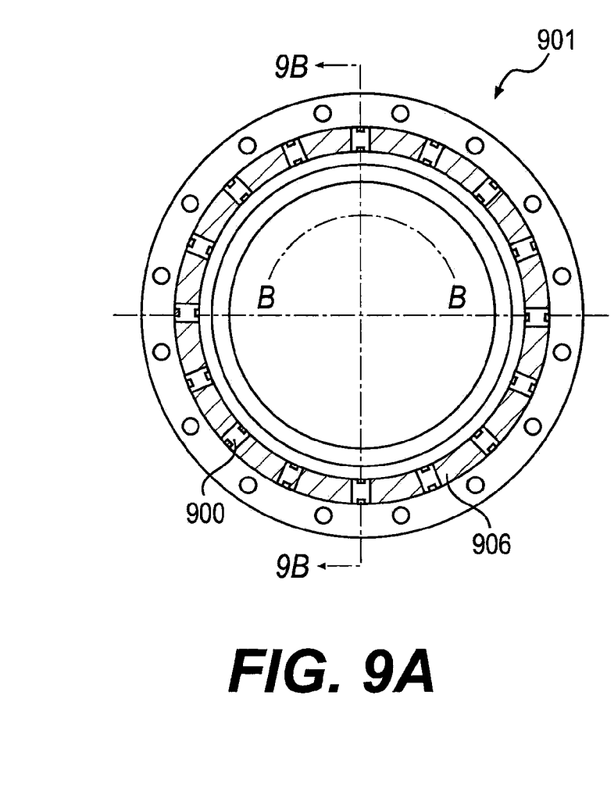
FIGS. 9A and 9B illustrate axial and radial cross-sectional illustrations of an exemplary disclosed turbine engine combustor having a plurality of heat flux gauges disposed thereupon.
Figure 9B:
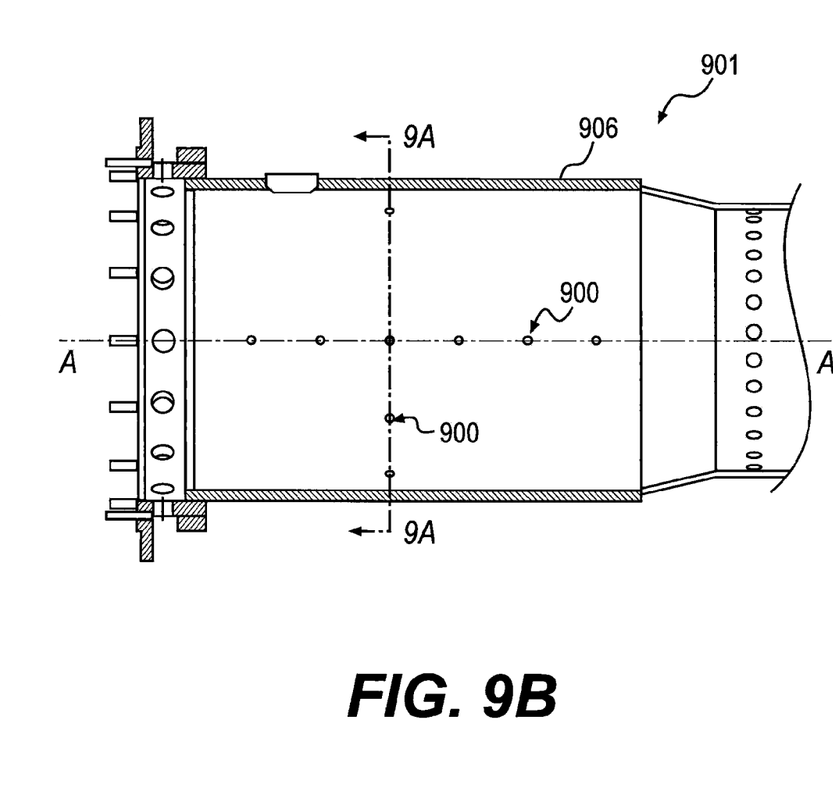

The heat flux gauges 100-800 disclosed above may be used to measure temperature gradients or heat transfers through any component, where such measurements are desired. For example, the heat flux gauges disclosed herein may be used in components of a turbine engine (FIGS. 9A, 9B, 10A, and 10B). In one embodiment, the heat flux gauges may be installed on a turbine engine combustor to measure the heat transfer parameters of the combustor wall. FIGS. 9A and 9B show an exemplary disclosed turbine engine combustor 901 including, among other components, a cylindrical combustor wall 906 generally corresponding to the supporting structures disclosed above. A plurality of heat flux gauges 900, similar to those described above (100-800), are disposed in cavities made in combustor wall 906. Heat flux gauges 900 may or may not be disposed at equal intervals. Furthermore, heat flux gauges 900 may be arranged along the axial direction (e.g., the A-A direction) of combustor wall 906 and/or around combustor wall 906 along the circumferential direction (e.g., the B-B direction). Accordingly, heat flux gauges 900 may be used to measure heat transfer parameters, such as temperature gradients, at various locations within turbine combustor wall 906 during engine operating conditions.

Figure 10A:
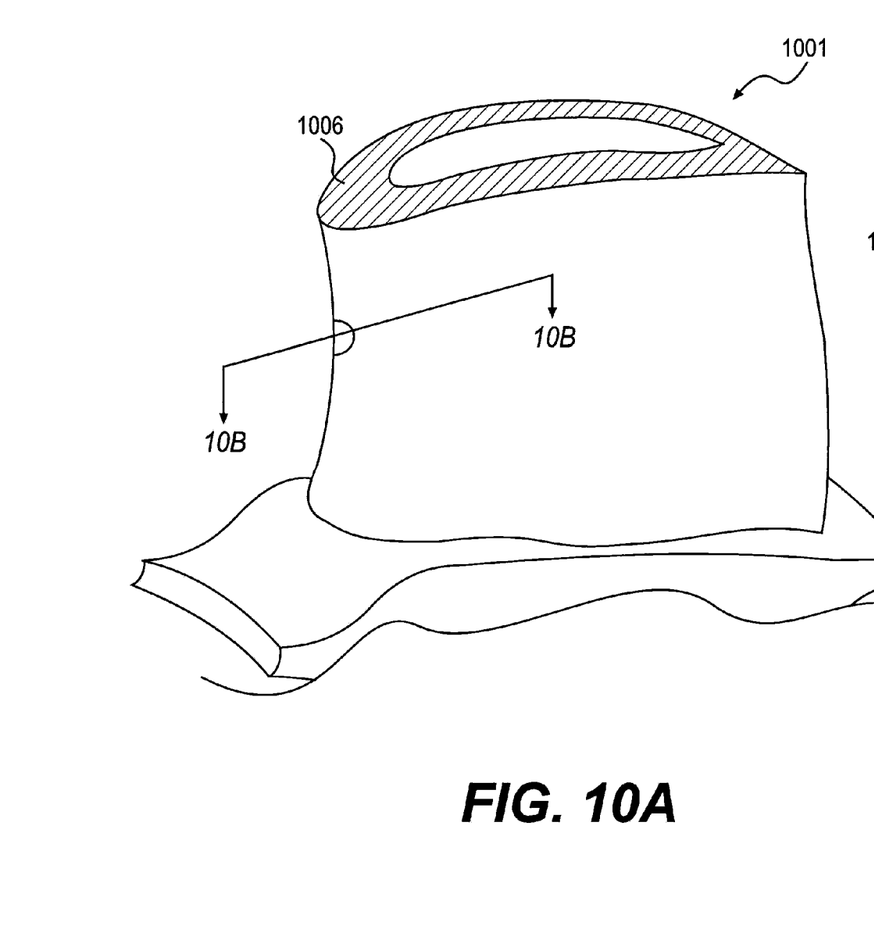
FIGS. 10A and 10B illustrate a perspective illustration and a partial cross-sectional illustration of a turbine blade having a heat flux gauge disposed thereupon.
Figure 10B:
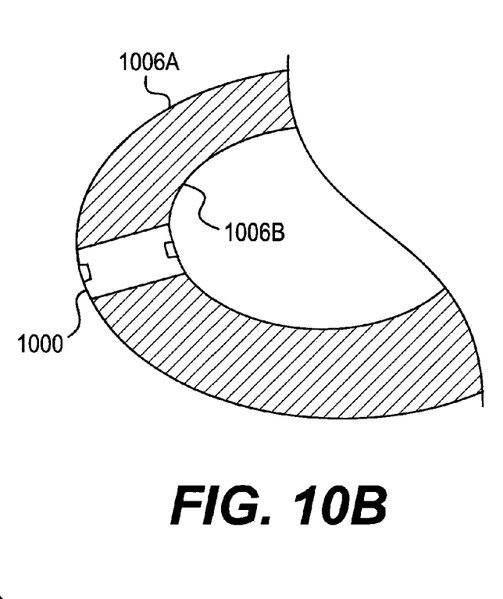

FIG. 10 shows a portion of an exemplary disclosed turbine blade 1001 and a heat flux gauge 1000 disposed within the side wall 1006 of turbine blade 1001. Turbine blade 1001 is a hollow structure, in which the side wall 1006 has an outer surface 1006A and an inner surface 1006B. Heat flux gauge 1000 can take the form of any heat flux gauges described above (100-800) and disposed and secured within a hole or bore made on the side wall of turbine blade 1001. During engine operation, high pressure and high temperature gasses flow onto turbine blade 1001, thereby driving turbine blade 1001 and the turbine shaft (not shown) to rotate. As a result, outer surface 1006A and inner surface 1006B of the side wall of turbine blade 1001 have different temperatures. Heat flux gauge 1000 is configured to provide the temperature variations across the side wall of turbine blade 1001 and provide the temperature data for determining heat transfer parameters of the side wall 1006.

Figure 11:
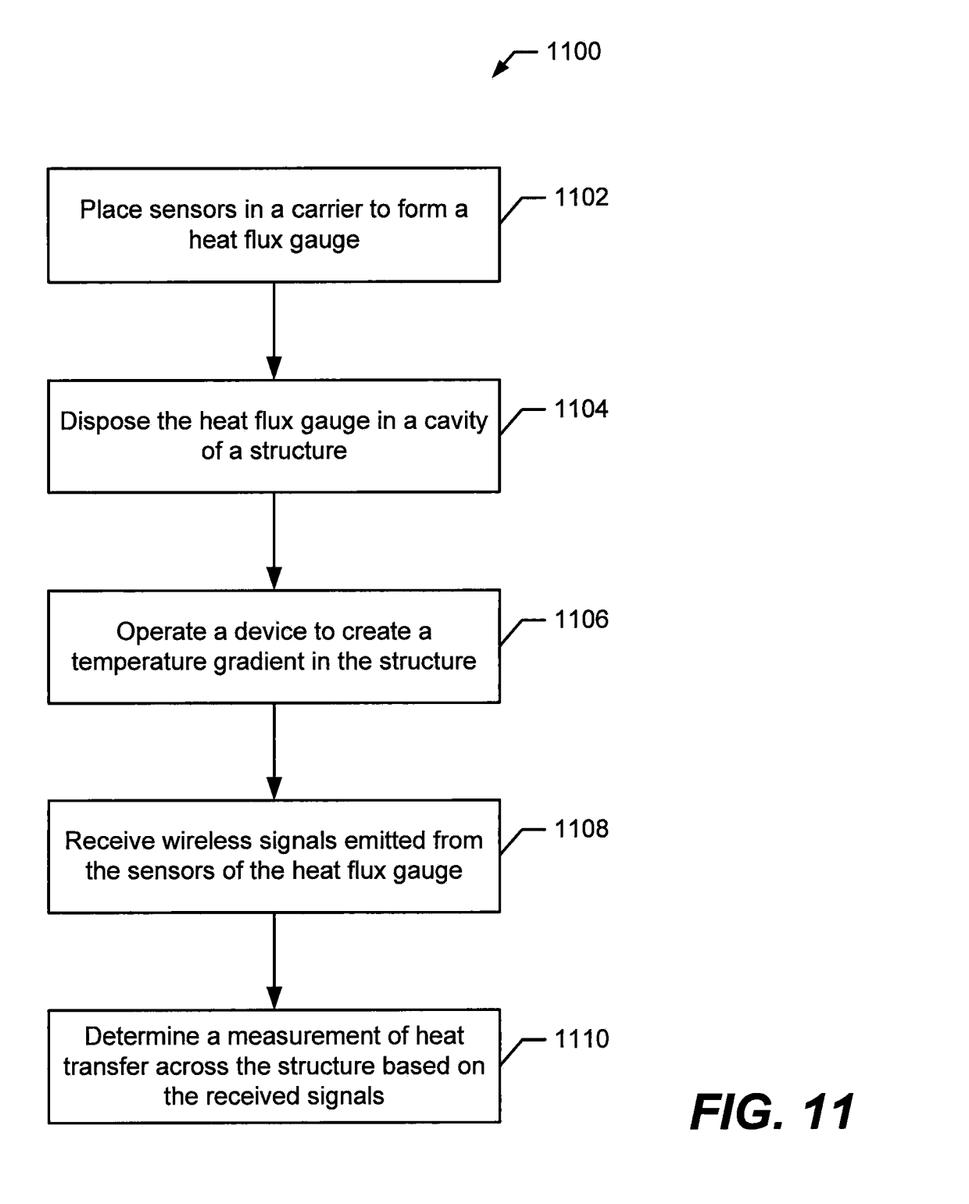
FIG. 11 is a flowchart of a process according to this disclosure.

FIG. 11 depicts a process 1100 for measuring heat transfer or heat flux through a supporting structure using a microscale crystal temperature sensors similar to those discussed above (100-1000). According to process 1100, at step 1102, a plurality of sensors are disposed in a carrier to form a heat flux gauge. The carrier may correspond to the carriers depicted in FIGS. 1A-10B. The sensors may be placed in cavities made on exterior surfaces, such as top faces or side walls, of the carrier. Alternatively or additionally, the sensors may also be placed in cavities made inside the carrier. The sensors are secured within the cavities by a bonding material. When fully disposed on the exterior surfaces, the sensors are substantially flush with the exterior surfaces.

At step 1104, the heat flux gauge formed at step 1102 is disposed in the supporting structure. The supporting structure may be any components of a mechanical system, such as turbine engines or internal combustion engines, in which the temperature parameters are of interest. In disposing the heat flux gauge in the supporting structure, a cavity or hole is made thereon. The heat flux gauge may be placed into the cavity or hole and secured through an interference fit. Alternatively, the heat flux gauge may be secured by an insert piece as depicted in FIGS. 4B and 4C. Still alternatively, the heat flux gauge may be secured by a bonding material filled in the cavity or hole of the supporting structure.

Furthermore, when disposed within the supporting structure, the heat flux gauge is oriented so that the sensors are placed along a direction of the heat transfer to be measured. For example, the heat flux gauge may be placed in a side wall of a combustion chamber as depicted in FIGS. 9A and 9B, the heat flux gauge is oriented so that at least one sensor is placed adjacent an exterior surface of the side wall and at least one other sensor is placed adjacent an interior surface of the side wall. Similarly, for the turbine blade depicted in FIG. 10A, the heat flux gauge is oriented so that at least one sensor is placed adjacent an exterior surface of the blade and at least one other sensor is placed adjacent an interior surface of the blade.

At step 1106, the mechanical system or device is operated so as to subject the supporting structure and the heat flux gauge disposed thereon to an operating condition. Under the operating condition, a temperature gradient is generated within the supporting structure. For example, the side wall of the combustion chamber depicted in FIGS. 9A and 9B may have different temperatures on the exterior surface and the interior surface during operation. Similarly, a temperature gradient may also be generated across the side wall of the turbine blade as depicted in FIG. 10A.

At step 1108, signals generated by the crystal temperature sensors are received by a signal detector. As discussed above, the crystal temperature sensor emits electromagnetic radiation according to the temperature sensed by the sensor. The strength of the electromagnetic radiation indicates the sensed temperature. The signal detector may capture the electromagnetic radiation generated by individual sensors of the heat flux gauge and convert the radiation signal to a temperature measurement. Accordingly, the temperatures sensed by the individual sensors may be determined based on the measurement provided by the detector.

According to a still further embodiment, the temperature signals may be collected from the temperature sensors after the temperature sensors are removed from the heat flux gauge. Specifically, after the supporting structure reaches it operating conditions, the heat flux gauge is removed from the supporting structure. The sensors of the heat flux gauge are then removed from the carrier, for instance, by applying a water-based solvent as described above. Since the temperature sensors have the ability to retain the temperature information after being removed from the supporting structure, the temperature information can be collected from the sensors by using the remote detector even after the heat flux gauge is removed from the supporting structure. According to a further embodiment, the temperature signal provided by the individual sensor may be an instant temperature at a particular time, a maximum or minimum temperature within a certain time interval, or an average temperature within the time interval.

At step 1110, the temperature gradient and heat flux across the supporting structure are determined based on the temperature parameters measured by the individual sensors. For example, the heat flux may be determined according to the following formula:

$$-k_m\left(\frac{T_{cold} - T_{hot}}{\Delta L}\right),$$

where $k_m$ indicates a heat transfer coefficient of the supporting structure, which may be obtained via experiments or engineering manuals, $T_{cold}$ indicates the temperature measurement provided by the sensor placed on the cold side of the supporting structure, $T_{hot}$ indicates the temperature measurement provided by the sensor placed on the hot side of the supporting structure, and $\Delta L$ indicates a distance between the sensors along the direction of the heat transfer.

When there are more than two sensors disposed along the direction of the heat transfer, the heat transfer across the supporting structure may be determined by first computing the heat transfer between each pair of adjacent sensors and then taking the average thereof. For example, as shown in FIGS. 3A and 3B, the heat flux through the supporting structure can be calculated using temperate information provided by any two of sensors 304A-B. Alternatively, the heat flux between sensors 304A and 304C and the heat flux between sensors 304C and 304B are first calculated. The resulting heat fluxes are averaged to provide the heat flux measurement across the supporting structure. In general, increasing the number of sensors along the direction of the heat flux, such as provided by the heat flux gauge in FIGS. 3A and 3B, also increases the number of temperature data points across the supporting structure, thereby improving the accuracy of the result.

Because signals generated by the crystal sensors of the heat flux gauges discussed above may be read by a wireless remote detector, the heat flux gauges are particularly suitable for measuring temperature parameters in harsh environments. For example in engine parts and components, which are subject to high temperatures and high pressures, wired connections cannot withstand the hash environment. Using the heat flux gauges having the crystal sensors described herein allows wirelessly collecting the temperature parameters of the engine parts and components, thereby overcoming the restrictions associated with the wired connections. Furthermore, the heat flux gauge is also suitable for application mechanical systems with moving parts or components. For example, the heat flux gauge can be used to measure temperature parameters of a turbine blade, when the turbine blade is rotated during operating conditions.

Furthermore, the heat flux gauge can be used for testing components and designs of mechanical systems. For example, the heat flux gauge can provide heat transfer parameters of new components or new designs and aid design improvements. Because of the small footprint of the heat flux gauge, disposing the heat flux gauge in the supporting structure does not substantially impact the mechanical characteristics or operations of the components. The heat flux gauge can also be used to determine service life or service condition of the components. The heat flux gauge can provide temperature information of the components during their operational life, which allows for determination of the service life and service condition. The components may be removed or replaced according to the temperature information provided by the heat flux gauge.

It is understood that the use of the terms "substantially," "generally," and "approximately," herein refers to slightly less than exact correspondence. For example, "substantially," "generally," and "approximately" may refer herein to a correspondence that is ±7% of the subject condition.

It will be apparent to those skilled in the art that various modifications and variations can be made to the disclosed heat flux gauge. Other embodiments will be apparent to those skilled in the art from consideration of the specification and practice of the disclosed heat flux gauge. It is intended that the specification and examples be considered as exemplary only, with a true scope being indicated by the following claims and their equivalents.

What is claimed is:

1. An apparatus for measuring temperature parameters of an engine component, comprising:
   a carrier removably disposed within a hole formed in the engine component, the carrier including at least one receiving portion; and
   a plurality of temperature sensors, disposed within and secured to the at least one receiving portion via a bonding medium, the temperature sensors being distributed along at least one direction of the carrier, wherein the carrier is oriented with respect to the engine component so that the direction of the carrier corresponds to a direction of heat transfer through the engine component, and the temperature sensors are configured to measure and record temperature information along the direction of heat transfer based on microstructural changes corresponding to temperatures experienced by the respective temperature sensors, and wherein the at least one receiving portion includes two receiving portions disposed within surfaces of the carrier at opposite ends of the carrier, and the temperature sensors and the bonding medium form a flush surface with the respective surfaces of the carrier.

2. The apparatus of claim 1, wherein the at least one receiving portion includes a plurality of receiving portions disposed in the respective surfaces of the carrier, and each of the temperature sensors is disposed within one of the plurality of receiving portions.

3. The apparatus of claim 1, wherein one of the plurality of temperature sensors is disposed substantially in a middle section of the carrier between the opposite ends of the carrier.

4. The apparatus of claim 1, wherein the carrier has a cylindrical shape.

5. The apparatus of claim 1, wherein:
   the carrier has a cubical shape; and
   the temperature sensors are disposed substantially close to respective vertices of the carrier.

6. The apparatus of claim 1, wherein:
   the carrier has a spherical shape;
   at least one of the temperature sensors is disposed substantially at a center of the carrier; and
   at least two of the temperature sensors are disposed substantially at opposite poles of the carrier.

7. The apparatus of claim 1, wherein:
   the carrier has a plug shape including a first cylindrical portion and a second cylindrical portion connected together in series; and
   a radial dimension of the first cylindrical portion is greater than a radial dimension of the second cylindrical portion.

8. The apparatus of claim 1, wherein the bonding medium includes a water-soluble adhesive.

9. The apparatus of claim 1, wherein:
   the temperature sensors include at least one Izmeritel Maximalnoi Temperaturi Kristalicheskii (IMTK) crystal sensor, the temperature sensors being configured to record a maximum temperature experienced by the temperature sensors and wirelessly communicate the maximum temperature to a detector by emitting electromagnetic signals; and
   the carrier is made of a metal or a metal alloy.

10. The apparatus of claim 1, wherein each of the temperature sensors has a dimension less than 1.0 mm.

11. The apparatus of claim 1, wherein the temperature information along the direction of heat transfer is obtained from the temperature sensors after the carrier is removed from the engine component and the temperature sensors are removed from the carrier.

12. The apparatus of claim 11, wherein the temperature sensors are removed from the carrier by a water solvent.

13. The apparatus of claim 1, wherein the carrier has a first dimension that is substantially equal to a dimension of the engine component.

14. The apparatus of claim 13, wherein the first dimension of the carrier is substantially equal to a thickness of the engine component.

15. The apparatus of claim 13, wherein the carrier has a second dimension that is less than or equal to about 6 mm.

* * * * *